US011537408B2

(12) United States Patent
Yu

(10) Patent No.: US 11,537,408 B2
(45) Date of Patent: *Dec. 27, 2022

(54) METHOD FOR MANAGING APPLICATION PROGRAM USE TIME OFFLINE, AND TERMINAL DEVICE

(71) Applicant: Huawei Technologies Co., Ltd., Guangdong (CN)

(72) Inventor: Shuangxin Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

This patent is subject to a terminal disclaimer.

(21) Appl. No.: 17/011,134

(22) Filed: Sep. 3, 2020

(65) Prior Publication Data

US 2020/0401419 A1 Dec. 24, 2020

Related U.S. Application Data

(63) Continuation of application No. 16/336,293, filed as application No. PCT/CN2016/099991 on Sep. 24, 2016, now Pat. No. 10,824,439.

(51) Int. Cl.
G06F 9/46 (2006.01)
G06F 9/445 (2018.01)
(Continued)

(52) U.S. Cl.
CPC ............ G06F 9/44505 (2013.01); G06F 1/24 (2013.01); G06F 3/0482 (2013.01);
(Continued)

(58) Field of Classification Search
CPC .................................................... G06F 9/44505
(Continued)

(56) References Cited

U.S. PATENT DOCUMENTS 8,793,774 B1 * 7/2014 Kumar .................... H04L 63/20
726/4
9,154,485 B1 * 10/2015 Fallows .................. H04L 63/08
(Continued)

FOREIGN PATENT DOCUMENTS

CN 101878477 A 11/2010
CN 102377585 A 3/2012
(Continued)

OTHER PUBLICATIONS

Chinese Office Action dated Mar. 2, 2022 for Application No. 202011472705, 39 pages.
(Continued)

*Primary Examiner* — Mehran Kamran

(57) ABSTRACT

A method for managing an application and a terminal device. The method includes: launching an application in response to an operation on the application received from a user, wherein a time limit is preset for the application, displaying a notification indicating that a use duration of the application reaches the time limit and a time extension is requested at a predetermined moment before the time limit expires, displaying an interface for an identity authentication after the time extension is selected by the user, and extending the use duration of the application when an identity authentication of the user succeeds. Thus the use duration of the application is manageable and controllable.

16 Claims, 14 Drawing Sheets

(51) Int. Cl.
  *G06F 21/62* (2013.01)
  *G06F 1/24* (2006.01)
  *G06F 3/04817* (2022.01)
  *G06F 3/0482* (2013.01)
  *G06F 3/04847* (2022.01)
  *G06F 21/32* (2013.01)

(52) U.S. Cl.
  CPC ...... *G06F 3/04817* (2013.01); *G06F 3/04847* (2013.01); *G06F 21/32* (2013.01); *G06F 21/62* (2013.01); *G06F 2221/2137* (2013.01); *G06F 2221/2149* (2013.01)

(58) Field of Classification Search
  USPC ......................................................... 718/100
  See application file for complete search history.

(56) References Cited

U.S. PATENT DOCUMENTS

| | | | | |
|---|---|---|---|---|
| 9,225,717 | B1* | 12/2015 | Brainard | H04L 9/3228 |
| 9,374,379 | B1* | 6/2016 | Hew | H04L 63/108 |
| 9,955,236 | B2* | 4/2018 | Landow | H04N 21/858 |
| 2008/0081600 | A1* | 4/2008 | Choi | H04W 52/0251 |
| | | | | 455/418 |
| 2012/0079110 | A1* | 3/2012 | Brown | G06F 21/6281 |
| | | | | 709/225 |
| 2012/0136998 | A1* | 5/2012 | Hough | H04L 67/1076 |
| | | | | 709/225 |
| 2012/0209904 | A1* | 8/2012 | Huang | H04L 69/28 |
| | | | | 709/203 |
| 2012/0276845 | A1* | 11/2012 | Wikander | G06Q 20/32 |
| | | | | 455/41.1 |
| 2012/0291101 | A1* | 11/2012 | Ahlstrom | H04W 12/082 |
| | | | | 726/4 |
| 2013/0124410 | A1* | 5/2013 | Kay | G07F 19/211 |
| | | | | 705/43 |
| 2013/0171961 | A1* | 7/2013 | You | H04M 15/881 |
| | | | | 455/406 |
| 2013/0226453 | A1* | 8/2013 | Trussel | H04M 3/42348 |
| | | | | 709/206 |
| 2013/0227675 | A1* | 8/2013 | Fujioka | G06F 21/62 |
| | | | | 726/16 |
| 2014/0096180 | A1* | 4/2014 | Negi | H04W 4/029 |
| | | | | 726/4 |
| 2014/0108491 | A1* | 4/2014 | Fan | H04L 63/108 |
| | | | | 709/201 |
| 2015/0056974 | A1* | 2/2015 | Kim | H04M 1/72448 |
| | | | | 455/418 |
| 2015/0066762 | A1* | 3/2015 | Chatterton | G06Q 20/322 |
| | | | | 705/44 |
| 2015/0082421 | A1* | 3/2015 | Flowers | G06F 1/3293 |
| | | | | 726/16 |
| 2015/0120000 | A1 | 4/2015 | Coffey et al. | |
| 2015/0347499 | A1* | 12/2015 | Keen | G16H 10/65 |
| | | | | 707/736 |
| 2016/0232336 | A1* | 8/2016 | Pitschel | H05K 999/99 |
| 2017/0061776 | A1* | 3/2017 | Scaria | G08B 25/008 |
| 2017/0223545 | A1* | 8/2017 | Suzuki | H04W 12/084 |
| 2017/0295250 | A1* | 10/2017 | Samaranayake | H04L 67/01 |
| 2019/0108908 | A1* | 4/2019 | Faulks | G08B 27/005 |

FOREIGN PATENT DOCUMENTS

| | | |
|---|---|---|
| CN | 104133693 A | 11/2014 |
| CN | 104360852 A | 2/2015 |
| CN | 104660821 A | 5/2015 |
| CN | 104765993 A | 7/2015 |
| CN | 104980565 A | 10/2015 |
| CN | 105120080 A | 12/2015 |
| CN | 105243322 A | 1/2016 |
| CN | 105278948 A | 1/2016 |
| CN | 105302598 A | 2/2016 |
| CN | 105446782 A | 3/2016 |
| CN | 105872247 A | 8/2016 |
| CN | 105955868 A | 9/2016 |
| EP | 2530552 A1 | 12/2012 |
| EP | 2975500 A1 | 1/2016 |
| JP | 2007117125 A | 5/2007 |
| JP | 2009303186 A | 12/2009 |
| JP | 2016057845 A | 4/2016 |
| KR | 20140066258 A | 5/2014 |
| WO | WO 2014/052934 A2 | 4/2014 |

OTHER PUBLICATIONS

Intellectual Property of India for Application No. 201717012031 dated Mar. 16, 2021, 7 pages.
Chinese Published Application No. CN 108604265 B dated Sep. 28, 2018, 23 pages.
Foreign Communication From a Counterpart Application, PCT Application No. PCT/CN2016/099991, English Translation of International Search Report dated Jun. 19, 2017, 2 pages.
Foreign Communication From a Counterpart Application, PCT Application No. PCT/CN2016/099991, English Translation of Written Opinion dated Jun. 19, 2017, 5 pages.
Foreign Communication From a Counterpart Application, European Application No. 16916558.6, Extended European Search Report dated Jul. 10, 2019, 7 pages.

* cited by examiner

METHOD FOR MANAGING APPLICATION PROGRAM USE TIME OFFLINE, AND TERMINAL DEVICE

CROSS-REFERENCE TO RELATED APPLICATIONS

This application is a continuation of U.S. patent application Ser. No. 16/336,293, filed on Mar. 25, 2019, which is a U.S. National Stage of International Patent Application No. PCT/CN2016/099991, filed on Sep. 24, 2016, both of which are hereby incorporated by reference in their entireties.

TECHNICAL FIELD

The present invention relates to the field of communications technologies, and in particular, to a method for managing an application program use time offline, and a terminal device.

BACKGROUND

People spend increasingly longer time on mobile phones. Among these users, a group of people do not pay attention to or do not effectively control application (Application, App) use times, and they have strong requirements for App time management. For example, when watching videos on a mobile phone, a user plans to browse videos for 10 minutes but actually concentrates his or her attention completely for half an hour.

In addition, a holder of parental responsibility has a requirement for performing parental control or "content lock" on App use of a child. If the holder of parental responsibility takes along a "key" for unlocking, the "content lock" is more effective.

Currently, a method for managing an APP use time offline is mainly a time control function that a child App has. A specific implementation process is as follows: an App has a built-in module for controlling time ranges, within which usually system rights of a mobile phone or a tablet computer cannot be obtained. In other words, logic determining cannot be performed by reading system time.

In the foregoing technical solution, a time control setting of the App can be bypassed by modifying the system time. Consequently, effectiveness is relatively low; and in addition, use time control is inflexible.

SUMMARY

In view of this, embodiments of the present invention provide a method for managing an application program use time offline, and a terminal device, to flexibly and effectively manage an App use time in an offline scenario.

An embodiment of the present invention provides a method for managing an application program use time offline, including:

displaying a desktop after a terminal device is started, and displaying an application icon on the desktop;

starting, after the application icon is clicked, a target application program corresponding to the application icon;

if the target application program corresponding to the application icon is an application program in which a time control rule is set, performing cumulative timing on actual use duration of the target application program, where the time control rule includes: a duration setting and an extension setting;

if a difference between the duration setting and the actual use duration is less than a preset threshold, prompting that a time limit is insufficient; and if the extension setting is set to yes, further displaying a message to indicate whether time extension is needed; and if identity authentication is performed after an instruction indicating that the time extension is needed, extending a use time if the identity authentication succeeds; otherwise, quitting and locking the target application program after the actual use duration reaches the duration setting.

In the foregoing embodiment, use time management is not all necessary when the application icon is displayed on the desktop; time control rules are set for those applications that need the use time management, and the applications are referred to as target application programs. In this embodiment, the cumulative timing should be understood as a cumulative time for which the target application program is used. In other words, if the target application program is closed and used again, a total time of previous-time use and this-time use is accumulated. How to implement the accumulation is not uniquely limited. The identity authentication is preferentially implemented by using a fingerprint authentication method, to prevent a time control solution from failing due to password leakage. The extension setting is a setting for extending the use time, and may usually include: resetting the use time, or increasing the duration setting. Any manner can be used, provided that the manner can enable the use time of the target application program to be longer. This is not uniquely limited in this embodiment of the present invention.

In an optional implementation, the extension setting includes: a resetting setting or a delay setting; and the extending a use time if the identity authentication succeeds includes: if the extension setting is the resetting setting, resetting the cumulative timing after determining that the identity authentication succeeds; or if the extension setting is the delay setting, extending a time specified by the duration setting after determining that the identity authentication succeeds.

In this embodiment, the resetting setting refers to a manner of setting an accumulated time to zero and performing timing again, and the delay setting means increasing duration for which the target application program can be used. Use time extension of a user can be conveniently controlled. Although the use time is extended, there is a reminder therein. Therefore, an objective of reminding the user to reduce use of the target application program can still be achieved. If a person who currently uses the target application program is not a person who sets an authentication method, the identity authentication cannot succeed to extend the use time. Therefore, use time control can be implemented. In this way, balance is achieved between two different types of users who use the target application program on the terminal device.

In an optional implementation, the time control rule further includes: an interval setting; and before the starting, after the application icon is clicked, a target application program corresponding to the application icon, the method further includes:

determining whether a time interval between a this-time start moment and a last-time close moment of the target program complies with the interval setting, and if yes, performing the starting, after the application icon is clicked, a target application program corresponding to the application icon; or if not, displaying prompt information of countdown whose start point is the difference between the duration setting and the actual use duration.

In this embodiment, it is further set that the time control rule includes the interval setting. This is because a relatively short duration setting may be set for some target application programs, and frequent use of these target application programs needs to be avoided. Therefore, adding the interval setting can achieve a relatively good effect.

In an optional implementation, this embodiment of the present invention further provides a time control rule setting solution, specifically as follows: before the starting, after the application icon is clicked, a target application program corresponding to the application icon, the method further includes:

displaying an application program management and setting interface, and displaying an application list after a user is authenticated;

receiving the target application program selected by the user, and receiving the time control rule for the target program; and displaying the time control rule for the target application in a display area of the application icon in the application list.

In an optional implementation, this embodiment of the present invention further provides an implementation solution that is based on different management interface start scenarios and that use different control policies, as follows: the displaying an application program management and setting interface, and displaying an application list after a user is authenticated includes:

displaying an application program management interface after receiving an application time management instruction on the setting and management interface; if this time is the first time for starting the application program management interface, directly displaying the application list, and receiving an authentication setting; or if this time is not the first time for starting the application program management interface, authenticating the user by using a method specified by the authentication setting, and displaying the application list after the user is authenticated.

In an optional implementation, in this embodiment of the present invention, fingerprint authentication may be preferably used, to prevent a case in which a use password is stolen. In addition, in the fingerprint authentication, fingerprints of different fingers may be set, and usually the fingers may be fingers that are not frequently used, specifically as follows: the authentication setting includes the fingerprint authentication; and the fingerprint authentication includes: setting fingerprint authentication for a finger.

In an optional implementation, this embodiment of the present invention further provides an implementation solution in which the desktop is displayed and then the application program management interface is displayed in an application scenario of setting the time control rule for the first time, as follows: if this time is the first time for starting the application program management interface, directly displaying the application list, and receiving an authentication setting, the method further includes:

displaying a lock screen interface after the terminal device is started, and after lock screen authentication succeeds, performing the displaying a desktop after a terminal device is started.

In an optional implementation, this embodiment of the present invention further provides an implementation solution in which the time control rule is conveniently viewed on the application icon displayed on the desktop, as follows: the displaying an application icon on the desktop includes:

displaying an annotation identifier on the application icon if the application icon is the icon corresponding to the target application program for which the time control rule is set; and displaying the time control rule if receiving an instruction for clicking the annotation identifier.

According to a second aspect, an embodiment of the present invention further provides a terminal device, including:

a display unit, configured to: display a desktop after the terminal device is started, and display an application icon on the desktop;

an application control unit, configured to start, after the application icon is clicked, a target application program corresponding to the application icon;

a timing unit, configured to: if the target application program corresponding to the application icon is an application program in which a time control rule is set, perform cumulative timing on actual use duration of the target application program, where the time control rule includes: a duration setting and an extension setting; and a prompt unit, configured to: if a difference between the duration setting and the actual use duration is less than a preset threshold, prompt that a time limit is insufficient; and if the extension setting is set to yes, further display a message to indicate whether time extension is needed, where the application control unit is further configured to: if identity authentication is performed after an instruction indicating that the time extension is needed, extend a use time if the identity authentication succeeds; otherwise, quit and lock the target application program after the actual use duration reaches the duration setting.

In an optional implementation, the extension setting includes: a resetting setting or a delay setting; and that the application control unit is configured to extend the use time if the identity authentication succeeds includes: if the extension setting is the resetting setting, resetting the cumulative timing after determining that the identity authentication succeeds; or if the extension setting is the delay setting, extending a time specified by the duration setting after determining that the identity authentication succeeds.

In an optional implementation, the time control rule further includes: an interval setting; and the application control unit is further configured to: before starting, after the application icon is clicked, the target application program corresponding to the application icon, determine whether a time interval between a this-time start moment and a last-time close moment of the target program complies with the interval setting, and if yes, perform the starting, after the application icon is clicked, the target application program corresponding to the application icon; or if not, control the display unit to display prompt information of countdown whose start point is the difference between the duration setting and the actual use duration.

In an optional implementation, the display unit is further configured to: before the target application program corresponding to the application icon is started after the application icon is clicked, display an application program management and setting interface, and display an application list after a user is authenticated;

the terminal device further includes:

a receiving unit, configured to: receive the target application program selected by the user, and receive the time control rule for the target program; and the display unit is further configured to display the time control rule for the target application in a display area of the application icon in the application list.

In an optional implementation, that the display unit is configured to: display the application program management and setting interface, and display the application list after the user is authenticated includes: displaying an application program management interface after receiving an application time management instruction on the setting and management interface; if this time is the first time for starting the application program management interface, directly displaying the application list, and receiving an authentication setting; or if this time is not the first time for starting the application program management interface, authenticating the user by using a method specified by the authentication setting, and displaying the application list after the user is authenticated.

In an optional implementation, the authentication setting includes fingerprint authentication; and the fingerprint authentication includes: setting fingerprint authentication for a finger.

In an optional implementation, the display unit is further configured to: before the if this time is the first time for starting the application program management interface, directly displaying the application list, and receiving an authentication setting, display a lock screen interface after the terminal device is started, and after lock screen authentication succeeds, perform the displaying a desktop.

In an optional implementation, that the display unit is configured to display the application icon on the desktop includes:

displaying an annotation identifier on the application icon if the application icon is the icon corresponding to the target application program for which the time control rule is set; and displaying the time control rule if receiving an instruction for clicking the annotation identifier.

It can be seen from the foregoing technical solutions that, there are the following advantages: the time control rule is set for the target application program, the time control rule includes the duration setting and the extension setting, and timing is performed in a cumulative time manner, avoiding a problem that security is relatively low due to use of system time. When the duration setting is used, not only use of the user is easy, but also the use time can be controlled. In addition, when an extension setting manner is used, on one hand, a target application use time of an unauthenticated user is limited, and on the other hand, normal use of an authenticated user is ensured and the authenticated user is reminded of use duration. In addition, a time control rule may be separately and independently set for each target application program. Therefore, the App use time may be flexibly and effectively managed in the offline scenario.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The embodiments of the present invention provide a solution in which a use time of any App on a terminal device is freely managed and controlled by using an App time manager (App Time Manager, ATM) when no connection to the Internet is needed. Absolute App use duration and absolute interval duration are used as timing standards, to avoid that a system time change bypasses management and control. ATM management rights authentication may invoke a system lock screen password. For a device with fingerprint support, using a system-specific fingerprint as an authentication credential is more recommended, so that a problem of a holder of parental responsibility that a mobile phone lock screen password is easy to be leaked is resolved.

Figure 1:
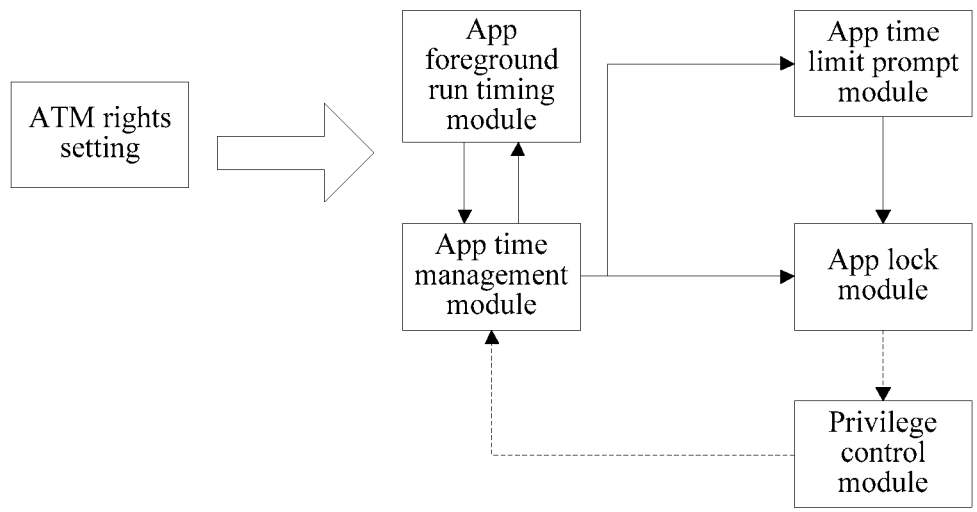
FIG. 1 is a schematic diagram of a system architecture according to an embodiment of the present invention.

In the following embodiment, an App used in a mobile phone is used as an example for description. It can be understood that, the technical solutions in the embodiments of the present invention may further be applied to another terminal device other than the mobile phone, for example, a personal computer, a tablet computer, or another terminal device. The following embodiments respectively describe the following aspects in detail:

1. As shown in FIG. 1, a system structure in the embodiments of the present invention includes:

an ATM rights setting, an App foreground run timing module, an App time management module, an App time limit prompt module, an App lock module, and a privilege control module, where the ATM rights setting is used as an input portion of the system structure;

the App time limit prompt module is an output control module, and outputs prompt information, including: an alarm, a pop-up window, automatic lock screen prompt, and the like; and the App lock module is a processing result of time control, including: quitting a running App, lock time prompt, or the like.

2. The modules in the system structure shown in FIG. 1 are described in detail as follows:

App foreground run timing module: periodically reporting a run time slice of a foreground App;

App time management module: adding, deleting, changing, and checking a managed App and a management manner, and storing an App cumulative use time;

App time limit prompt module: invoking an alarm clock interface; and providing material management of a lock screen interface;

App lock module: invoking an App program quitting interface; starting an App lock program; and prompting that a use time exceeds a limit and is unavailable;

ATM rights setting: initiating a rights setting; and privilege control module: authenticating rights, intervening with an App that performs time management, and providing a resetting or delay function.

Figure 2:
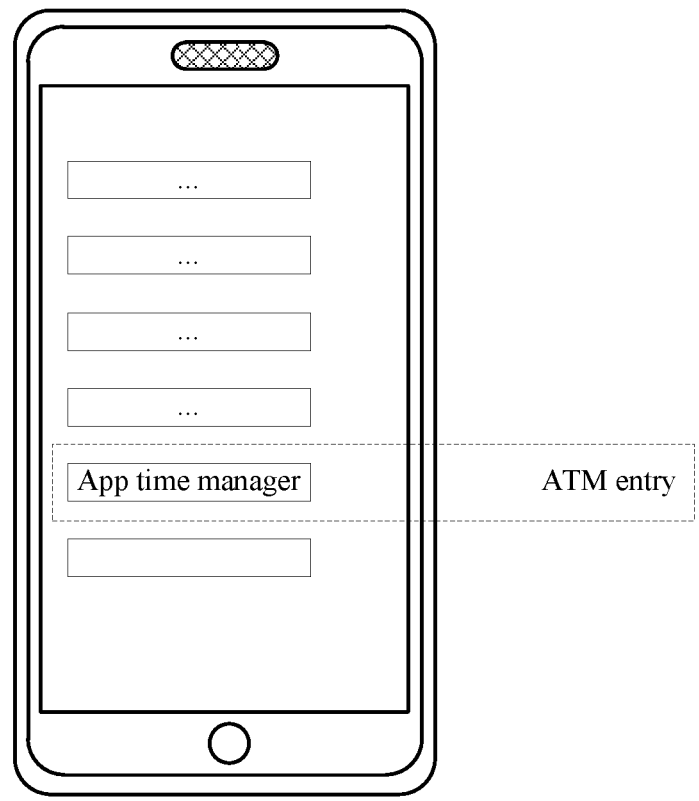
FIG. 2 is a schematic diagram of an operation interface according to an embodiment of the present invention.

3. An example of a key procedure that is based on a user side:

Step 1:

As shown in FIG. 2, a user starts a mobile phone, displays all setting and management interfaces of the mobile phone, and finds a menu "App time manager", as shown by an ATM entry marked in FIG. 2.

Figure 3:
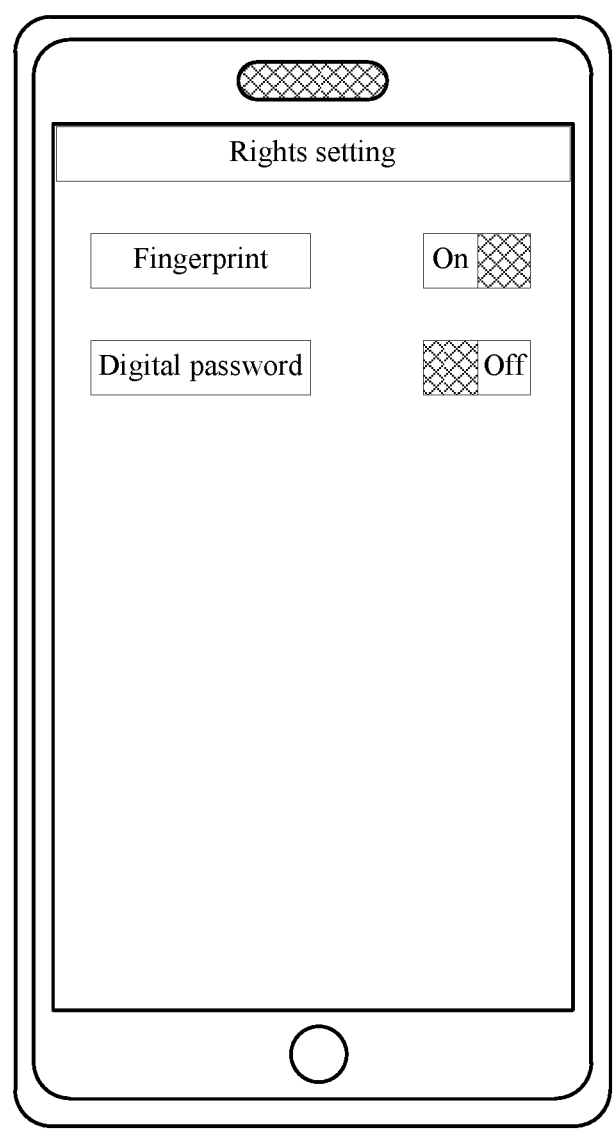
FIG. 3 is a schematic diagram of an operation interface according to an embodiment of the present invention.

Step 2:

In first-time use, as shown in FIG. 3, the user may directly display a rights module management page to perform rights setting; and specifically may select a rights control manner through switch control. For a device with a fingerprint, fingerprint authentication is recommended. Both the fingerprint authentication and digital password authentication may be implemented by invoking a module related to a mobile phone system.

Figure 4:
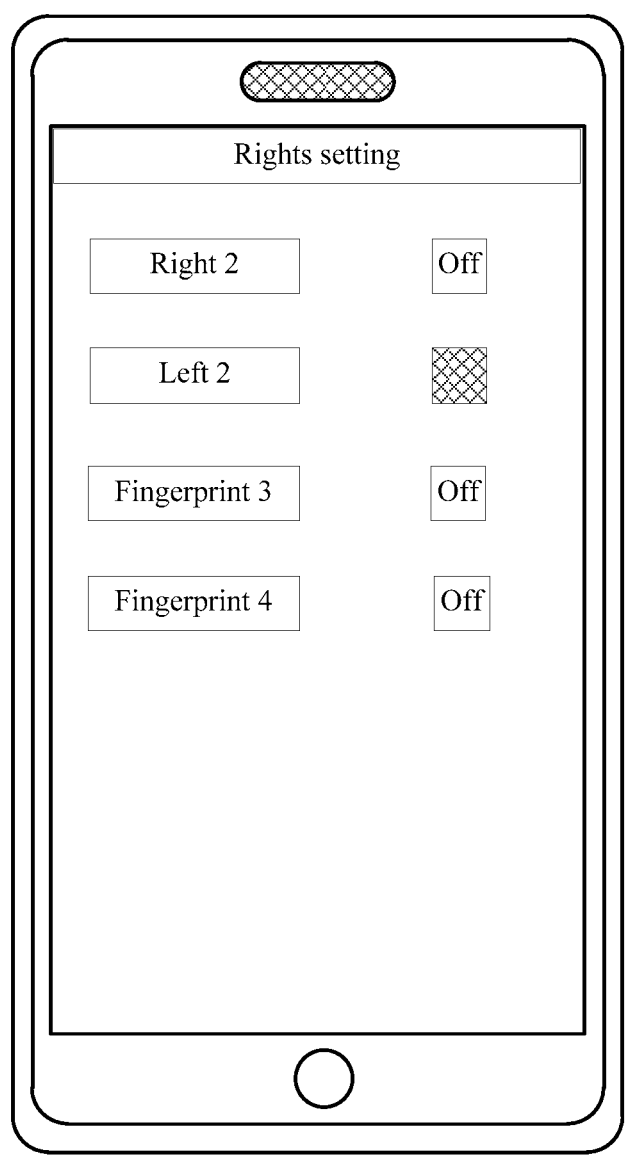
FIG. 4 is a schematic diagram of an operation interface according to an embodiment of the present invention.

If the user switches on a fingerprint switch, a selection dialog box pops up, and then the user selects a specific fingerprint, as shown in FIG. 4.

Figure 5:
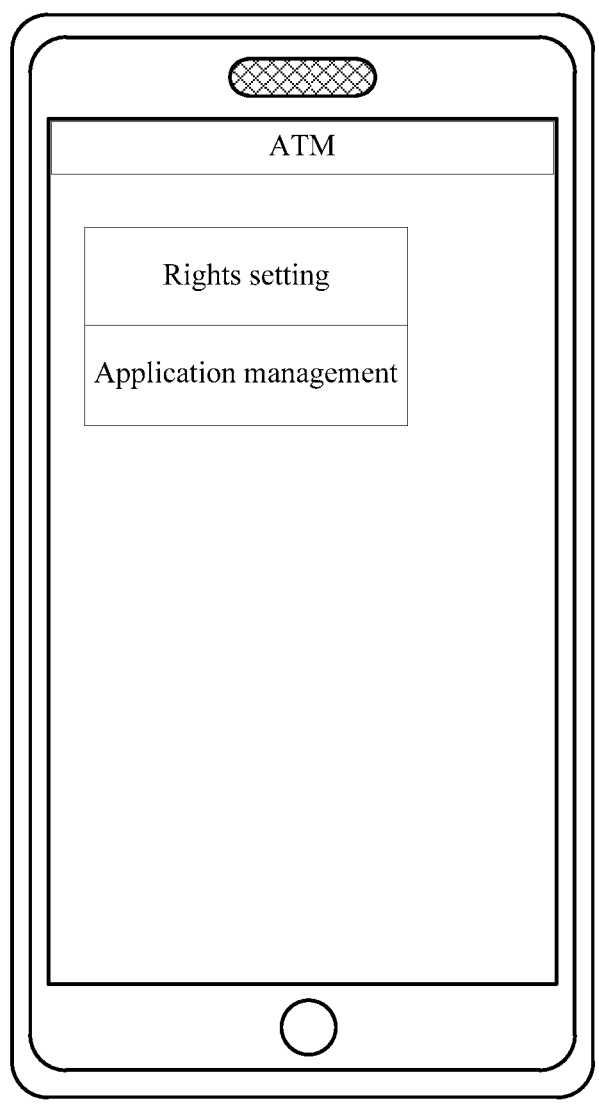
FIG. 5 is a schematic diagram of an operation interface according to an embodiment of the present invention.
Figure 6:
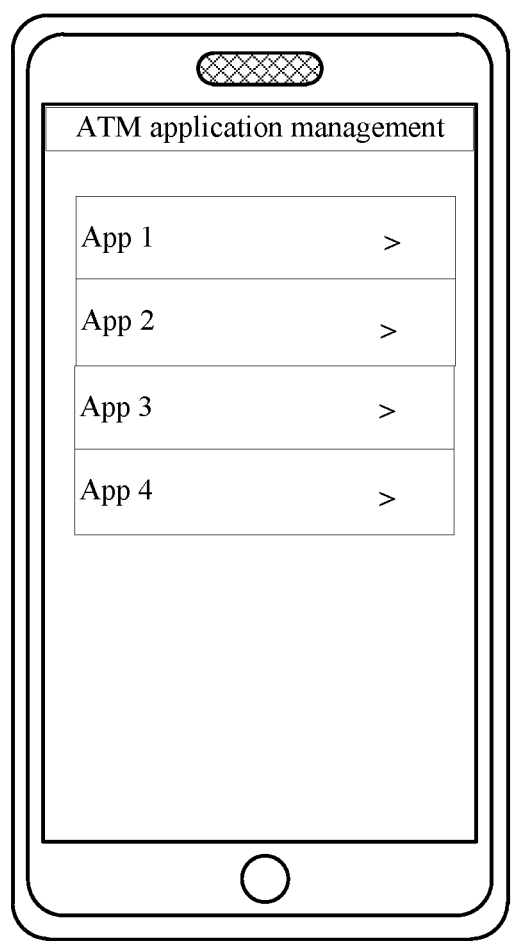
FIG. 6 is a schematic diagram of an operation interface according to an embodiment of the present invention.
Figure 7:
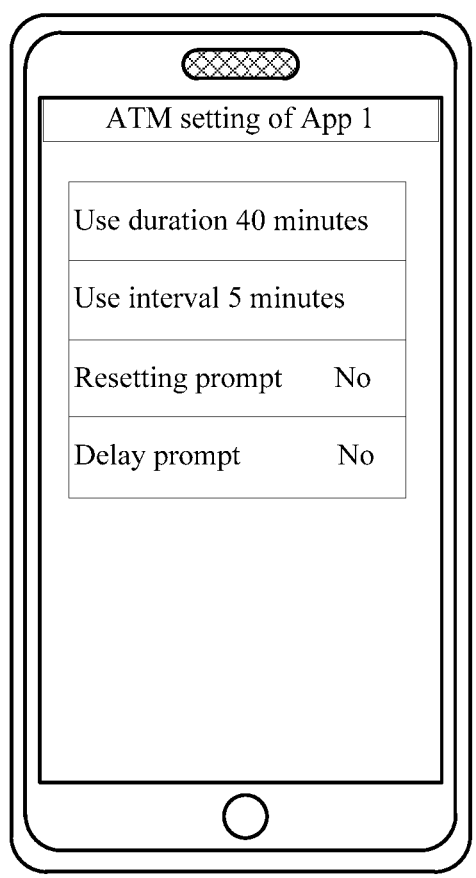
FIG. 7 is a schematic diagram of an operation interface according to an embodiment of the present invention.

Step 3:

As shown in FIG. 5, an ATM page is displayed, and after "App management" is selected, an ATM application management interface of the mobile phone is displayed as shown in FIG. 6. An App application list is displayed, and the user clicks App 1 to display a management and setting page of an App 1. FIG. 7 shows an ATM setting of the App 1.

Step 4:

An App time control rule is set. Using an App 1 in the following figure as an example, for the duration and the interval, values need to be set, and time units need to be selected. For the selection of resetting prompt and delay prompt, only "Yes" and "No" options are provided.

The time control rule shown in FIG. 7 includes: a use time of 40 minutes, a use interval of 5 minutes, and both the resetting prompt and the delay prompt are No.

Figure 8:
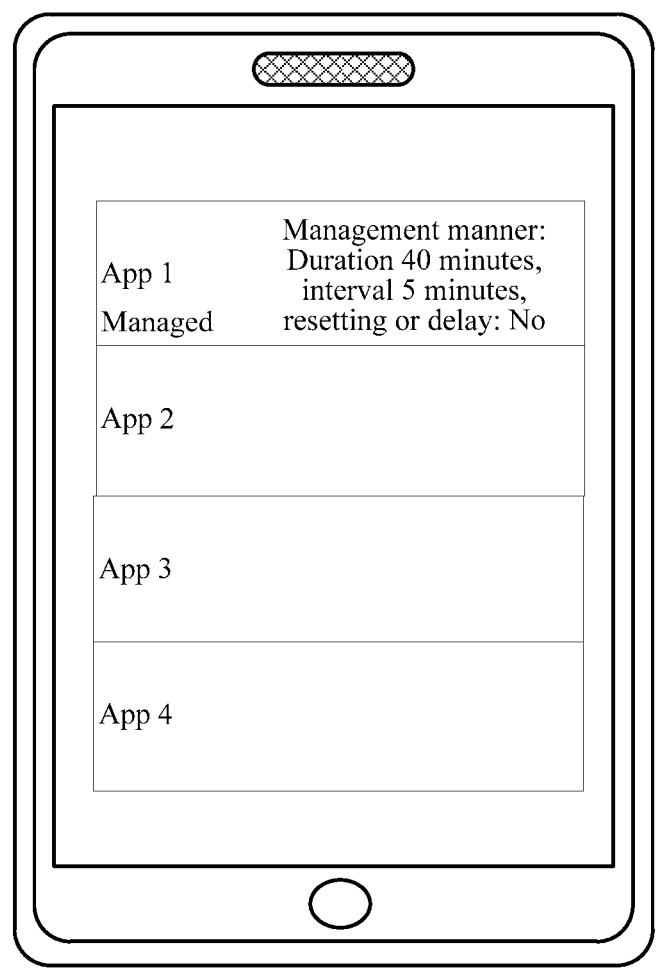
FIG. 8 is a schematic diagram of an operation interface according to an embodiment of the present invention.

After the setting is completed, the "ATM App management" interface is displayed again. The effect is shown in FIG. 8.

On an application icon App 1, "Managed" and content of the time control rule are displayed.

Figure 9:
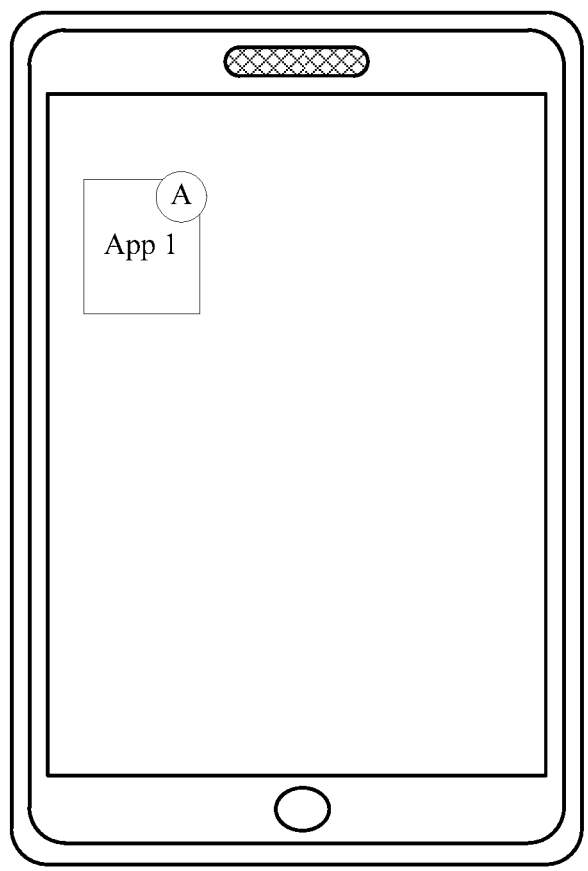
FIG. 9 is a schematic diagram of an operation interface according to an embodiment of the present invention.
Figure 10:
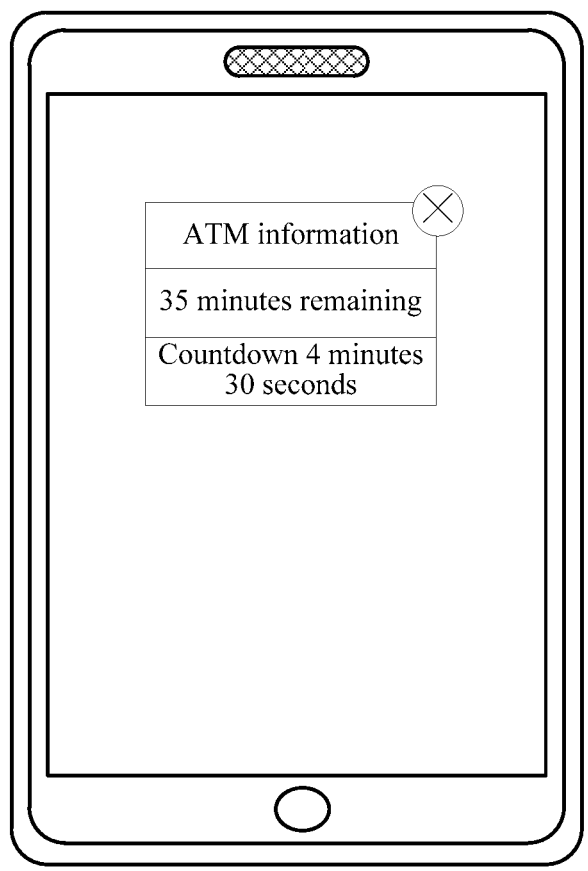
FIG. 10 is a schematic diagram of an operation interface according to an embodiment of the present invention.

Step 5:

It is assumed that, after the App 1 setting is managed and used once, display on the desktop of the mobile phone is shown in FIG. 9. In an upper right corner of App 1, a circle A is marked, representing that the App 1 is managed by an ATM program. The icon is clicked, and ATM information, namely, remaining duration and use interval countdown, is displayed, as shown in FIG. 10.

Figure 11:
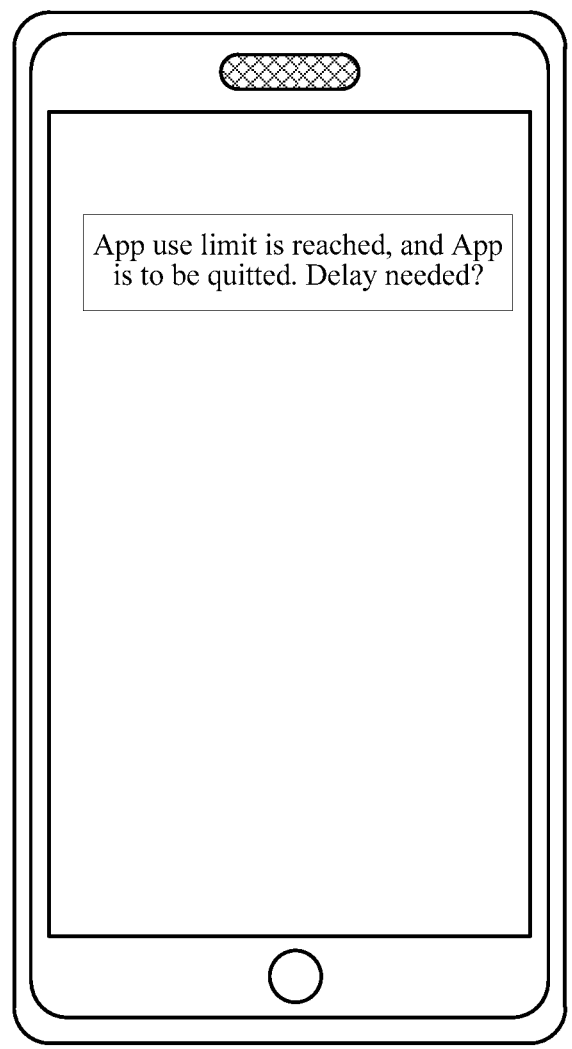
FIG. 11 is a schematic diagram of an operation interface according to an embodiment of the present invention.

Step 6:

As shown in FIG. 11, before an App is quit because a use time expires, resetting or a delay is prompted if the resetting or the delay has been set for the App. Confirmation or setting needs to be performed after authentication.

Figure 12:
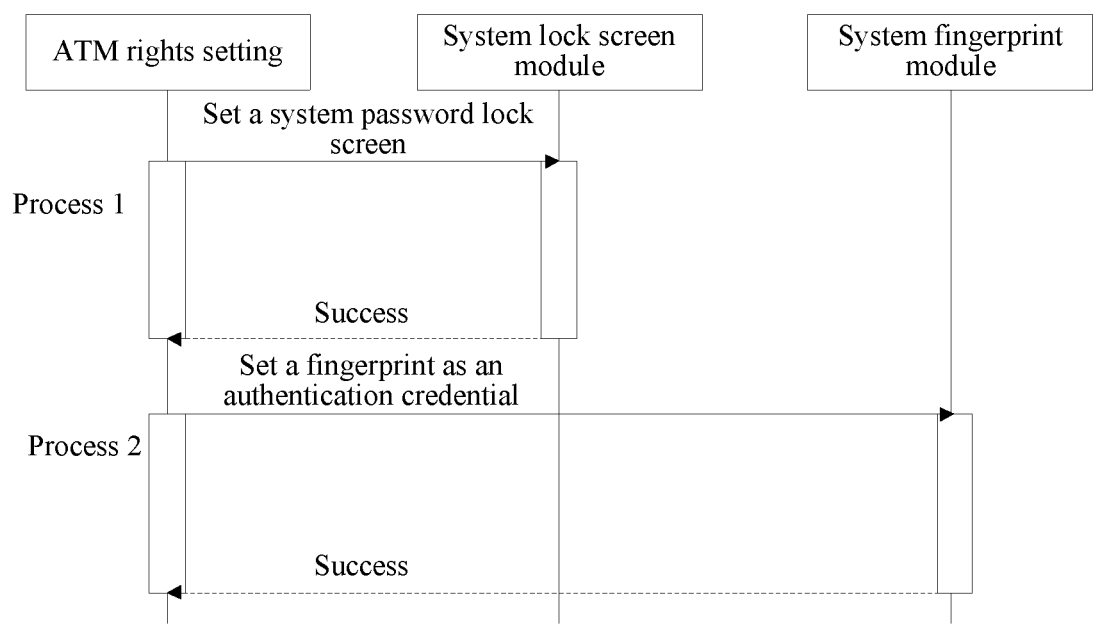
FIG. 12 is a schematic flowchart of a method according to an embodiment of the present invention.

4. An interaction process related to rights:

In this embodiment, rights interaction includes a process 1 and a process 2. The two processes are collateral, and at least one process needs to be performed. As shown in FIG. 12, the rights interaction includes:

Process 1: The ATM rights setting invokes the system lock screen module, to set a system password lock screen. A lock screen password may be used in rights authentication. The system lock screen module returns a result after determining that the setting succeeds.

Process 2: The ATM rights setting invokes the system fingerprint module, to set a fingerprint as an authentication credential, and use a specified fingerprint as an authentication credential.

Figure 13:
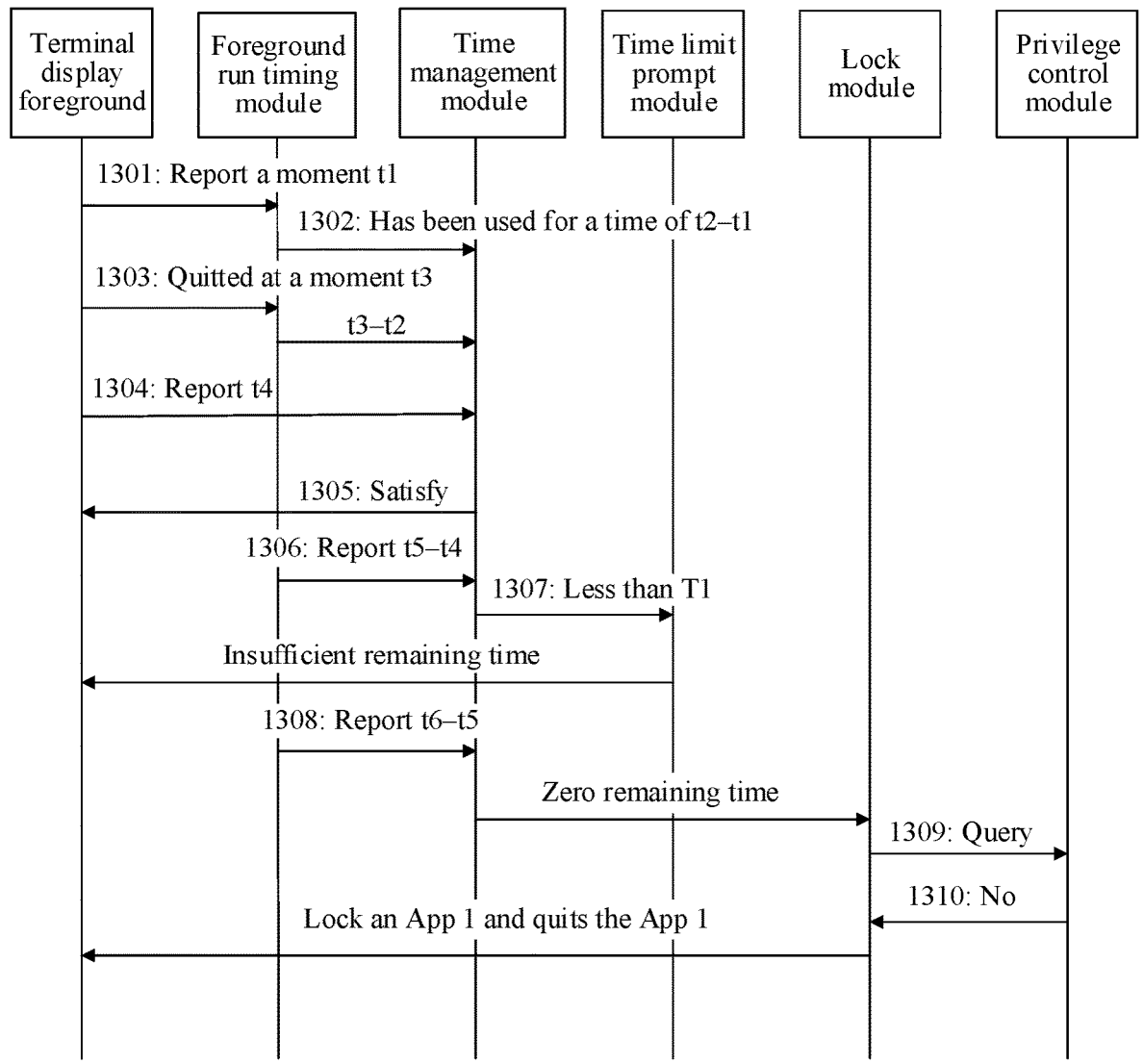
FIG. 13 is a schematic flowchart of a method according to an embodiment of the present invention.

5. Timing and management interaction:

Using the App 1 as an example, two manners, namely, duration and interval, are set for a time control rule of the App 1, and the resetting or the delay is set to Yes. As shown in FIG. 13, an App 1 use time management system interaction process is as follows, including the following steps:

1301: At a moment t1, when the App 1 is used, a terminal display foreground reports the moment t1.

1302: The foreground run timing module reports a time slice t2−t1 at a moment t2, and transmits a difference to the time management module, and the time management module records that the App 1 has been used for a time of t2−t1.

1303: Use of the App 1 is quit at a moment t3, and the terminal display foreground sends t3 to the foreground run timing module; and the foreground run timing module records a quitting time point t3, calculates a difference between t3 and the moment t2 at which the time slice is reported last time, and transmits the difference to the time management module. In this case, the time management module records that the App 1 has been used for a total time of t3−t1.

1304: The App 1 is used again, the terminal display foreground reports t4 to the time management module.

1305: The time management module first determines whether a difference between the time at which the use is quit last time and the time of this-time use satisfies a time interval setting, that is, whether t4−t3 is less than the use interval. If the difference satisfies the time interval setting, use is allowed; or if the difference does not satisfy the time interval setting, "Countdown XX minutes XX seconds" is prompted. In this embodiment, it is assumed that the difference satisfies the time interval setting and a subsequent procedure continues.

1306: After the App 1 has been used for a period of time, the foreground run timing module reports t5−t4 to the time management module at a moment t5, and the time management module records that a remaining time for the App 1 is less than T1, and reports this to the time limit prompt module.

1307: The time limit prompt module displays a pop-up window prompting that the remaining time of a user is less than T1.

1308: The App 1 is used again for a T1 time, the foreground run timing module reports t6−t5 to the time management module at a moment t6, and the time management module records that a limit is reached, and sends, to the lock module, a message prompting that the remaining time is zero.

1309: The lock module sends a resetting or delay query to the privilege control module, and the privilege control module displays a pop-up window prompting the user whether to reset or delay.

1310: A resetting or delay setting requires rights authentication to be first performed, and after the authentication succeeds, use may continue; and if No is selected, an instruction for locking the App 1 is returned to the lock module, and the lock module locks the App 1 and quits the App 1.

In this embodiment of the present invention, a use time management manner may be separately set for each App, to enable management to be freer. This helps a consumer who has weak self-discipline improve a capability of controlling a time spent on an entertaining App. This further provides a fingerprint "key" for a holder of parental responsibility to carry about, to more effectively manage and control a time spent by a child on a mobile device.

Figure 14:
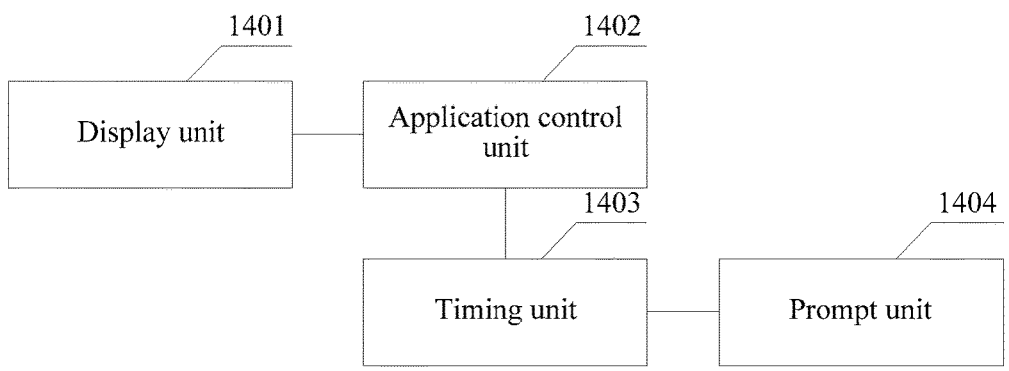
FIG. 14 is a schematic structural diagram of a terminal device according to an embodiment of the present invention.

An embodiment of the present invention further provides a terminal device. As shown in FIG. 14, the terminal device includes:

a display unit 1401, configured to: display a desktop after the terminal device is started, and display an application icon on the desktop;

an application control unit 1402, configured to start, after the application icon is clicked, a target application program corresponding to the application icon;

a timing unit 1403, configured to: if the target application program corresponding to the application icon is an application program in which a time control rule is set, perform cumulative timing on actual use duration of the target application program, where the time control rule includes: a duration setting and an extension setting; and a prompt unit 1404, configured to: if a difference between the duration setting and the actual use duration is less than a preset threshold, prompt that a time limit is insufficient; and if the extension setting is set to yes, further display a message to indicate whether time extension is needed, where the application control unit 1402 is further configured to: if identity authentication is performed after an instruction indicating that the time extension is needed, extend a use time if the identity authentication succeeds; otherwise, quit and lock the target application program after the actual use duration reaches the duration setting.

Optionally, the extension setting includes: a resetting setting or a delay setting; and that the application control unit 1402 is configured to extend the use time if the identity authentication succeeds includes: if the extension setting is the resetting setting, resetting the cumulative timing after determining that the identity authentication succeeds; or if the extension setting is the delay setting, extending a time specified by the duration setting after determining that the identity authentication succeeds.

Optionally, the time control rule further includes: an interval setting; and the application control unit 1402 is further configured to: before starting, after the application icon is clicked, the target application program corresponding to the application icon, determine whether a time interval between a this-time start moment and a last-time close moment of the target program complies with the interval setting, and if yes, perform the starting, after the application icon is clicked, the target application program corresponding to the application icon; or if not, control the display unit 1401 to display prompt information of countdown whose start point is the difference between the duration setting and the actual use duration.

Further, the display unit 1401 is further configured to: before the target application program corresponding to the application icon is started after the application icon is clicked, display an application program management and setting interface, and display an application list after a user is authenticated.

Figure 15:
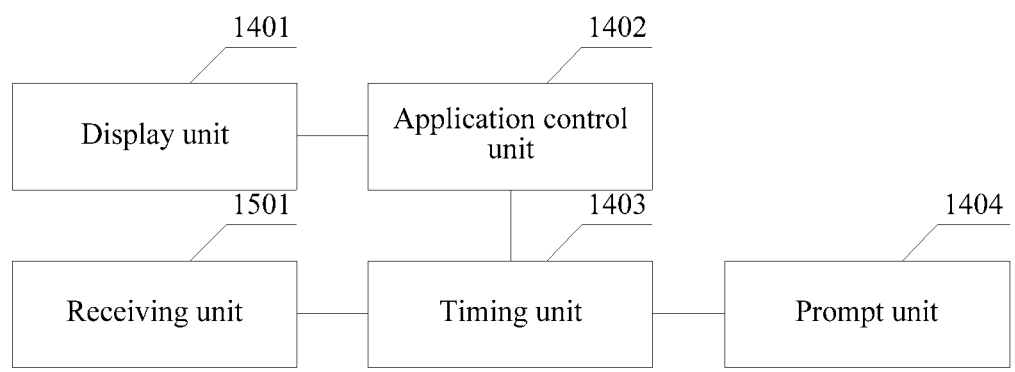
FIG. 15 is a schematic structural diagram of a terminal device according to an embodiment of the present invention.

As shown in FIG. 15, the terminal device further includes:

a receiving unit 1501, configured to: receive the target application program selected by the user, and receive the time control rule for the target program; and the display unit 1401 is further configured to display the time control rule for the target application in a display area of the application icon in the application list.

Optionally, that the display unit 1401 is configured to: display the application program management and setting interface, and display the application list after the user is authenticated includes: displaying an application program management interface after receiving an application time management instruction on the setting and management interface; if this time is the first time for starting the application program management interface, directly displaying the application list, and receiving an authentication setting; or if this time is not the first time for starting the application program management interface, authenticating the user by using a method specified by the authentication setting, and displaying the application list after the user is authenticated.

Optionally, the authentication setting includes fingerprint authentication; and the fingerprint authentication includes: setting fingerprint authentication for a finger.

Further, the display unit 1401 is further configured to: before the application is started, if this time is the first time for starting the application program management interface, directly displaying the application list, and receiving an authentication setting, display a lock screen interface after the terminal device is started, and after lock screen authentication succeeds, perform the displaying a desktop.

Optionally, that the display unit 1401 is configured to display the application icon on the desktop includes:

displaying an annotation identifier on the application icon if the application icon is the icon corresponding to the target application program for which the time control rule is set; and displaying the time control rule if receiving an instruction for clicking the annotation identifier.

Figure 16:
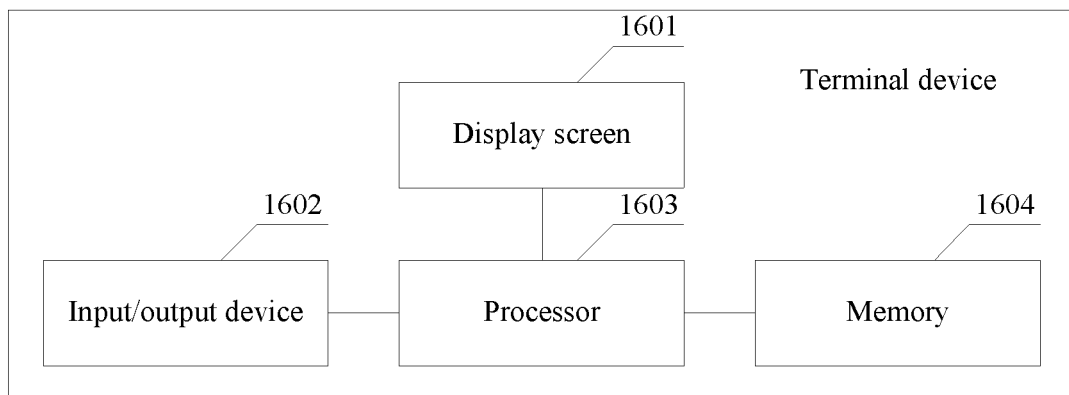
FIG. 16 is a schematic structural diagram of a terminal device according to an embodiment of the present invention.

An embodiment of the present invention further provides another terminal device. As shown in FIG. 16, the terminal device includes: a display screen 1601, an input/output device 1602, a processor 1603, and a memory 1604. The memory 1604 may be configured to store any data of the terminal device, and may further be configured to provide a cache needed in a process of data processing performed by the processor 1603.

The processor 1603 is configured to control and perform: displaying a desktop after a terminal device is started, and displaying an application icon on the desktop; starting, after the application icon is clicked, a target application program corresponding to the application icon; if the target application program corresponding to the application icon is an application program in which a time control rule is set, performing cumulative timing on actual use duration of the target application program, where the time control rule includes: a duration setting and an extension setting; if a difference between the duration setting and the actual use duration is less than a preset threshold, prompting that a time limit is insufficient; and if the extension setting is set to yes, further displaying a message to indicate whether time extension is needed; and if identity authentication is performed after an instruction indicating that the time extension is needed, extending a use time if the identity authentication succeeds; otherwise, quitting and locking the target application program after the actual use duration reaches the duration setting.

Optionally, the extension setting includes: a resetting setting or a delay setting; and that the processor 1603 is configured to control and perform: extending the use time if the identity authentication succeeds includes: if the extension setting is the resetting setting, resetting the cumulative timing after determining that the identity authentication succeeds; or if the extension setting is the delay setting, extending a time specified by the duration setting after determining that the identity authentication succeeds.

Further, the time control rule further includes: an interval setting; and the processor 1603 is further configured to control and perform: before starting, after the application icon is clicked, the target application program corresponding to the application icon, determining whether a time interval between a this-time start moment and a last-time close moment of the target program complies with the interval setting, and if yes, performing the starting, after the application icon is clicked, the target application program corresponding to the application icon; or if not, controlling the display unit to display prompt information of countdown whose start point is the difference between the duration setting and the actual use duration.

Further, the processor 1603 is further configured to control and perform: before the target application program corresponding to the application icon is started after the application icon is clicked, displaying an application program management and setting interface, and displaying an application list after a user is authenticated;

receiving the target application program selected by the user, and receiving the time control rule for the target program; and displaying the time control rule for the target application in a display area of the application icon in the application list.

Optionally, that the processor 1603 is configured to control and perform: displaying the application program management and setting interface, and displaying the application list after the user is authenticated includes:

displaying an application program management interface after receiving an application time management instruction on the setting and management interface; if this time is the first time for starting the application program management interface, directly displaying the application list, and receiving an authentication setting; or if this time is not the first time for starting the application program management interface, authenticating the user by using a method specified by the authentication setting, and displaying the application list after the user is authenticated.

Optionally, the authentication setting includes fingerprint authentication; and the fingerprint authentication includes: setting fingerprint authentication for a finger.

Further, before that the processor 1603 is configured to control and perform: if this time is the first time for starting the application program management interface, directly displaying the application list, and receiving an authentication setting, the method further includes:

displaying a lock screen interface after the terminal device is started, and after lock screen authentication succeeds, performing the displaying a desktop after a terminal device is started.

Optionally, that the processor 1603 is configured to control and perform: displaying the application icon on the desktop includes:

displaying an annotation identifier on the application icon if the application icon is the icon corresponding to the target application program for which the time control rule is set; and displaying the time control rule if receiving an instruction for clicking the annotation identifier.

Figure 17:
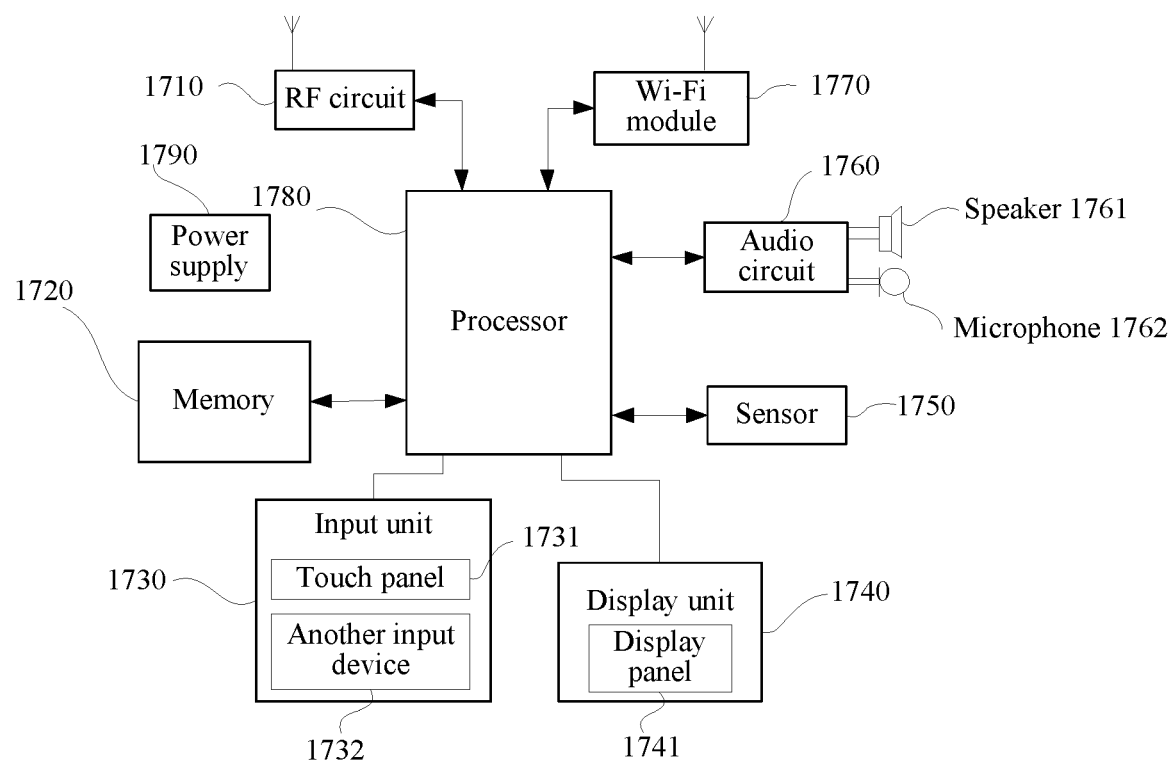
FIG. 17 is a schematic structural diagram of a terminal device according to an embodiment of the present invention.

An embodiment of the present invention further provides another terminal device. As shown in FIG. 17, for ease of description, only parts related to the embodiments of the present invention are shown. For specific technical details that are not disclosed, refer to the method part of the embodiments of the present invention. The terminal device may be any terminal device, including a mobile phone, a tablet computer, a PDA (Personal Digital Assistant, personal digital assistant), a POS (Point of Sales, point of sales), an in-vehicle computer, or the like. An example in which the terminal device is a mobile phone is used:

FIG. 17 is a block diagram of a partial structure of a mobile phone related to a terminal device according to an embodiment of the present invention. Referring to FIG. 17, the mobile phone includes components such as a radio frequency (Radio Frequency, RF) circuit 1710, a memory 1720, an input unit 1730, a display unit 1740, a sensor 1750, an audio circuit 1760, a wireless fidelity (wireless fidelity, Wi-Fi) module 1770, a processor 1780, and a power supply 1790. A person skilled in the art may understand that the structure of the mobile phone shown in FIG. 17 does not constitute a limitation on the mobile phone, and the mobile phone may include more or fewer components than those shown in the figure, or some components may be combined, or different component arrangements may be used.

The following specifically describes the components of the mobile phone with reference to FIG. 17.

The RF circuit 1710 may be configured to: receive and send information and receive and send a signal during a call process. Specifically, the RF circuit receives downlink information from a base station, then delivers the downlink information to the processor 1780 for processing, and sends related uplink data to the base station. Usually, the RF circuit 1710 includes, but is not limited to, an antenna, at least one amplifier, a transceiver, a coupler, a low noise amplifier (Low Noise Amplifier, LNA), a duplexer, and the like. In addition, the RF circuit 1710 may also communicate with a network and another device through wireless communication. The wireless communication may use any communication standard or protocol, which includes, but is not limited to, a Global System for Mobile Communications (Global System for Mobile Communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short messaging service (Short Messaging Service, SMS), and the like.

The memory 1720 may be configured to store a software program and module. The processor 1780 runs the software program and module stored in the memory 1720, to perform various functional applications and data processing of the mobile phone. The memory 1720 may mainly include a program storage area and a data storage area. The program storage area may store an operating system, an application program required by at least one function (such as a sound playback function and an image display function), and the like. The data storage area may store data (such as audio data and an address book) created based on use of the mobile phone, and the like. In addition, the memory 1720 may include a high speed random access memory, and may further include a nonvolatile memory, such as at least one magnetic disk storage device, a flash memory, or another volatile solid-state storage device.

The input unit 1730 may be configured to receive input digit or character information, and generate keyboard signal input related to a user setting and function control of the mobile phone. Specifically, the input unit 1730 may include a touch panel 1731 and another input device 1732. The touch panel 1731, also referred to as a touchscreen, may collect a touch operation of a user on or near the touch panel 1731 (such as an operation of the user on the touch panel 1731 or near the touch panel 1731 by using any suitable object or accessory such as a finger or a stylus), and drive a corresponding connection apparatus based on a preset program. Optionally, the touch panel 1731 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1780. Moreover, the touch controller can receive and execute a command sent from the processor 1780. In addition, the touch panel 1731 may be implemented into a plurality of types such as a resistive, capacitive, infrared, or surface acoustic wave type touch panel. In addition to the touch panel 1731, the input unit 1730 may further include the another input device 1732. Specifically, the another input device 1732 may include, but is not limited to, one or more of a physical keyboard, a functional key (such as a volume control key or a switch key), a trackball, a mouse, and a joystick.

The display unit 1740 may be configured to display information entered by the user or information provided for the user, and various menus of the mobile phone. The display unit 1740 may include a display panel 1741. Optionally, the display panel 1741 may be configured by using a liquid crystal display (Liquid Crystal Display, LCD), an organic light-emitting diode (Organic Light-Emitting Diode, OLED), or the like. Further, the touch panel 1731 may cover the display panel 1741. After detecting a touch operation on or near the touch panel 1731, the touch panel 1731 transfers the touch operation to the processor 1780, to determine the type of the touch event. Then, the processor 1780 provides a corresponding visual output on the display panel 1741 according to the type of the touch event. Although, in FIG. 17, the touch panel 1731 and the display panel 1741 are used as two separate parts to implement input and input functions of the mobile phone, in some embodiments, the touch panel 1731 and the display panel 1741 may be integrated to implement the input and output functions of the mobile phone.

The mobile phone may further include at least one sensor 1750 such as an optical sensor, a motion sensor, and other sensors. Specifically, the optical sensor may include an ambient light sensor and a proximity sensor. The ambient light sensor may adjust luminance of the display panel 1741 based on brightness of ambient light. The proximity sensor may switch off the display panel 1741 and/or backlight when the mobile phone is moved to the ear. As one type of motion sensor, an accelerometer sensor may detect magnitude of accelerations in various directions (usually on three axes), may detect magnitude and a direction of the gravity when static, and may be configured to identify an application of a mobile phone gesture (such as switchover between horizontal and vertical screens, a related game, and magnetometer posture calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

An audio frequency circuit 1760, a speaker 1761, and a microphone 1762 may provide an audio interface between the user and the mobile phone. The audio frequency circuit 1760 may convert received audio data into an electrical signal and transmit the electrical signal to the speaker 1761. The speaker 1761 converts the electrical signal into a sound signal for output. On the other hand, the microphone 1762 converts a collected sound signal into an electrical signal. The audio frequency circuit 1760 receives the electrical signal and converts the electrical signal into audio data, and outputs the audio data to the processor 1780 for processing. Then, the processor 1780 sends the audio data to, for example, another mobile phone by using the RF circuit 1710, or outputs the audio data to the memory 1720 for further processing.

Wi-Fi is a short-range wireless transmission technology. The mobile phone may help, by using the Wi-Fi module 1770, the user receive and send e-mails, browse a web page, access streaming media, and so on, and provides wireless broadband Internet access for the user. Although FIG. 17 shows the Wi-Fi module 1770, it may be understood that the Wi-Fi module is not a necessary component of the mobile phone, and when required, the Wi-Fi module may be omitted, provided that the scope of the essence of the present invention is not changed.

The processor 1780 is a control center of the mobile phone, and is connected to various parts of the mobile phone by using various interfaces and lines. By running or executing the software program and/or module stored in the memory 1720, and invoking data stored in the memory 1720, the processor 1780 performs various functions and data processing of the mobile phone, thereby performing overall monitoring on the mobile phone. Optionally, the processor 1780 may include one or more processing units. Preferably, the processor 1780 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1780.

The mobile phone further includes a power supply 1790 (such as a battery) for supplying power to the components. Preferably, the power supply may be logically connected to the processor 1780 by using a power management system, thereby implementing functions such as charging, discharging, and power consumption management by using the power management system.

Although not shown, the mobile phone may further include a camera, a Bluetooth module, and the like, and details are not described herein.

The steps performed by the terminal device in the foregoing embodiments may be based on the hardware structure shown in FIG. 17.

It should be noted that, the terminal device division is merely logical function division, but the present invention is not limited to the foregoing division, provided that corresponding functions can be implemented. In addition, specific names of the functional units are merely provided for the purpose of distinguishing the units from one another, but are not intended to limit the protection scope of the present invention.

In addition, a person of ordinary skill in the art may understand that all or some of the steps of the method embodiments may be implemented by a program instructing relevant hardware. The program may be stored in a computer readable storage medium. The storage medium may include: a read-only memory, a magnetic disk, or an optical disc.

The foregoing descriptions are merely example implementation manners of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. An electronic device, comprising:
a display;
at least one processor; and
a memory comprising instructions that when executed by the at least one processor, cause the electronic device to perform, at least, the following:
launching a first application;
displaying a first prompt when a difference between a first time limit preset for the first application and a first amount of usage time for the first application is less than or equal to a preset threshold;
displaying a first icon corresponding to the first application by changing a visual appearance of the first icon when the first amount of usage time reaches the first time limit;
displaying a second prompt indicating that the first amount of usage time reaches the first time limit and locking the first application;
launching a second application;
displaying a third prompt indicating that a second amount of usage time for the second application reaches a second time limit preset for the second application and locking the second application;
receiving an instruction requesting time extension for the second application;
detecting a sequence of digits input on the electronic device for password authentication; and
extending a time period of the second application in response to a determination that the detected sequence of digits corresponds to a preset password.

2. The electronic device according to claim 1, wherein the instructions, when executed by the at least one processor, further cause the electronic device to perform:
displaying an application time management interface comprising a rights setting option and an application management option;
receiving a first input for selecting the rights setting option;
receiving, after said selecting the rights setting option, the preset password based on a second input;
receiving a third input for selecting the application management option;
displaying, in response to said selecting the application management option, a plurality of applications installed in the electronic device;
receiving a fourth input for selecting the first application from the plurality of applications;
receiving, after said selecting the first application, the first time limit for the first application;
receiving a fifth input for selecting the second application from the plurality of applications; and
receiving, after said selecting the first application, the second time limit for the second application.

3. The electronic device according to claim 1, wherein the extending the time period of the second application comprises extending the time period of the second application by a predetermined time.

4. The electronic device according to claim 1, wherein the extending the time period of the second application comprises resetting a use duration for the second application.

5. The electronic device according to claim 1, wherein an interval is preset for the second application, and wherein the instructions, when executed by the at least one processor, further cause the electronic device to perform determining that a duration between a current moment of said launching the second application and a previous moment of closing the second application complies with the interval before performing said launching the second application.

6. The electronic device according to claim 1, wherein the instructions, when executed by the at least one processor, further cause the electronic device to perform displaying a first identifier on the first icon corresponding to the first application to indicate that the first time limit is set for the first application.

7. The electronic device according to claim 6, wherein the instructions, when executed by the at least one processor, further cause the electronic device to perform displaying the first time limit based on a sixth input on the first identifier.

8. A method for an electronic device, comprising:
launching a first application;
displaying a first prompt when a difference between a first time limit preset for the first application and a first amount of usage time for the first application is less than or equal to a preset threshold;
displaying a first icon corresponding to the first application by changing a visual appearance of the first icon when the first amount of usage time reaches the first time limit;
displaying a second prompt indicating that the first amount of usage time reaches the first time limit and locking the first application;
launching a second application;
displaying a third prompt indicating that a second amount of usage time for the second application reaches a second time limit preset for the second application and locking the second application;

receiving an instruction requesting time extension for the second application;

detecting a sequence of digits input on the electronic device for password authentication; and extending a time period of the second application in response to a determination that the detected sequence of digits corresponds to a preset password.

9. The method according to claim 8, further comprising:

displaying an application time management interface comprising a rights setting option and an application management option;

receiving a first input for selecting the rights setting option;

receiving, after said selecting the rights setting option, the preset password based on a second input;

receiving a third input for selecting the application management option;

displaying, in response to said selecting the application management option, a plurality of applications installed in the electronic device;

receiving a fourth input for selecting the first application from the plurality of applications;

receiving, after said selecting the first application, the first time limit for the first application;

receiving a fifth input for selecting the second application from the plurality of applications; and receiving, after said selecting the first application, the second time limit for the second application.

10. The method according to claim 8, wherein the extending the time period of the second application comprises extending the time period of the second application by a predetermined time.

11. The method according to claim 8, wherein the extending the time period of the second application comprises resetting a use duration for the second application.

12. The method according to claim 8, wherein an interval is preset for the second application, and wherein the method further comprises:

determining that a duration between a current moment of said launching the second application and a previous moment of closing the second application complies with the interval before performing said launching the second application.

13. The method according to claim 8, further comprising: displaying a first identifier on the first icon corresponding to the first application to indicate that the first time limit is set for the first application.

14. The method according to claim 13, further comprising:

displaying the first time limit based on a sixth input on the first identifier.

15. The method according to claim 8, wherein the second prompt and the third prompt are displayed in a form of a pop-up window.

16. A non-transitory computer readable medium including instructions stored thereon, which, when executed by at least one processor, cause an electronic device to perform operations comprising:

launching a first application;

displaying a first prompt when a difference between a first time limit preset for the first application and a first amount of usage time for the first application is less than or equal to a preset threshold;

displaying a first icon corresponding to the first application by changing a visual appearance of the first icon when the first amount of usage time reaches the first time limit;

displaying a second prompt indicating that the first amount of usage time reaches the first time limit and locking the first application;

launching a second application;

displaying a third prompt indicating that a second amount of usage time for the second application reaches a second time limit preset for the second application and locking the second application;

receiving an instruction requesting time extension for the second application;

detecting a sequence of digits input on the electronic device for password authentication; and extending a time period of the second application in response to determination that the detected sequence of digits corresponds to a preset password.

* * * * *